United States Patent
Carney et al.

(10) Patent No.: US 9,049,305 B2
(45) Date of Patent: Jun. 2, 2015

(54) GRANULAR CONTROL SYSTEM

(75) Inventors: Mark D. Carney, Sterling, VA (US); Martin W. McKee, Herndon, VA (US); Dante J. Pacella, Charles Town, WV (US); Jeffrey A. Jackson, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 502 days.

(21) Appl. No.: 13/435,671

(22) Filed: Mar. 30, 2012

(65) Prior Publication Data
US 2013/0260721 A1    Oct. 3, 2013

(51) Int. Cl.
*H04Q 7/00*   (2006.01)
*H04M 1/725*   (2006.01)
*H04L 29/06*   (2006.01)

(52) U.S. Cl.
CPC ........... *H04M 1/72566* (2013.01); *H04L 63/10* (2013.01); *H04M 1/72577* (2013.01)

(58) Field of Classification Search
CPC .................................. H04W 48/08; H04W 4/24
USPC .................... 455/419, 405, 418, 420
See application file for complete search history.

(56) References Cited

U.S. PATENT DOCUMENTS

| | | | |
|---|---|---|---|
| 7,516,219 B2 * | 4/2009 | Moghaddam et al. | 709/225 |
| 8,068,825 B2 * | 11/2011 | Mikan et al. | 455/419 |
| 8,204,494 B2 * | 6/2012 | Weinzierl | 455/419 |
| 8,356,337 B2 * | 1/2013 | Scott et al. | 726/4 |
| 8,634,803 B1 * | 1/2014 | Baker et al. | 455/405 |
| 8,699,998 B2 * | 4/2014 | Sprigg et al. | 455/410 |
| 2008/0020803 A1 * | 1/2008 | Rios et al. | 455/565 |
| 2012/0291101 A1 * | 11/2012 | Ahlstrom et al. | 726/4 |
| 2013/0225151 A1 * | 8/2013 | King et al. | 455/419 |

* cited by examiner

*Primary Examiner* — Ajit Patel
*Assistant Examiner* — Julio Perez

(57) ABSTRACT

A method may include receiving, from a first party, restrictions associated with each of a number of applications stored on a mobile device and storing the restrictions, wherein the restrictions include time based restrictions and/or use based restrictions. The method also includes receiving, from a user of the mobile device, a request for access to a first application and providing access to the first application in response to the request. The method further includes receiving, from the user, a second request for performing a first action by the first application and determining whether first action is permitted based on the stored restrictions.

22 Claims, 8 Drawing Sheets

| PROGRAM 410 | TIME RESTRICTIONS 420 | CONTENT RESTRICTIONS 430 | OTHER 440 |
|---|---|---|---|
| EBOOK READER | PLEASURE READING - MON-FRI: 8AM-7:30PM SCHOOL – 11PM-6AM | | |
| TEXT MESSAGING | MON-FRI: 4PM-8PM SAT-SUN: 10AM-10PM | | PROXY VIA PARENT DEVICE |
| INTERNET BROWSER | MON-FRI: 6AM-3PM | ADULT CONTENT | |
| GAMES | 2 HOURS PER DAY | | |
| EMAIL | | | NO ATTACHMENTS |
| ... | ... | ... | ... |

FIG. 4

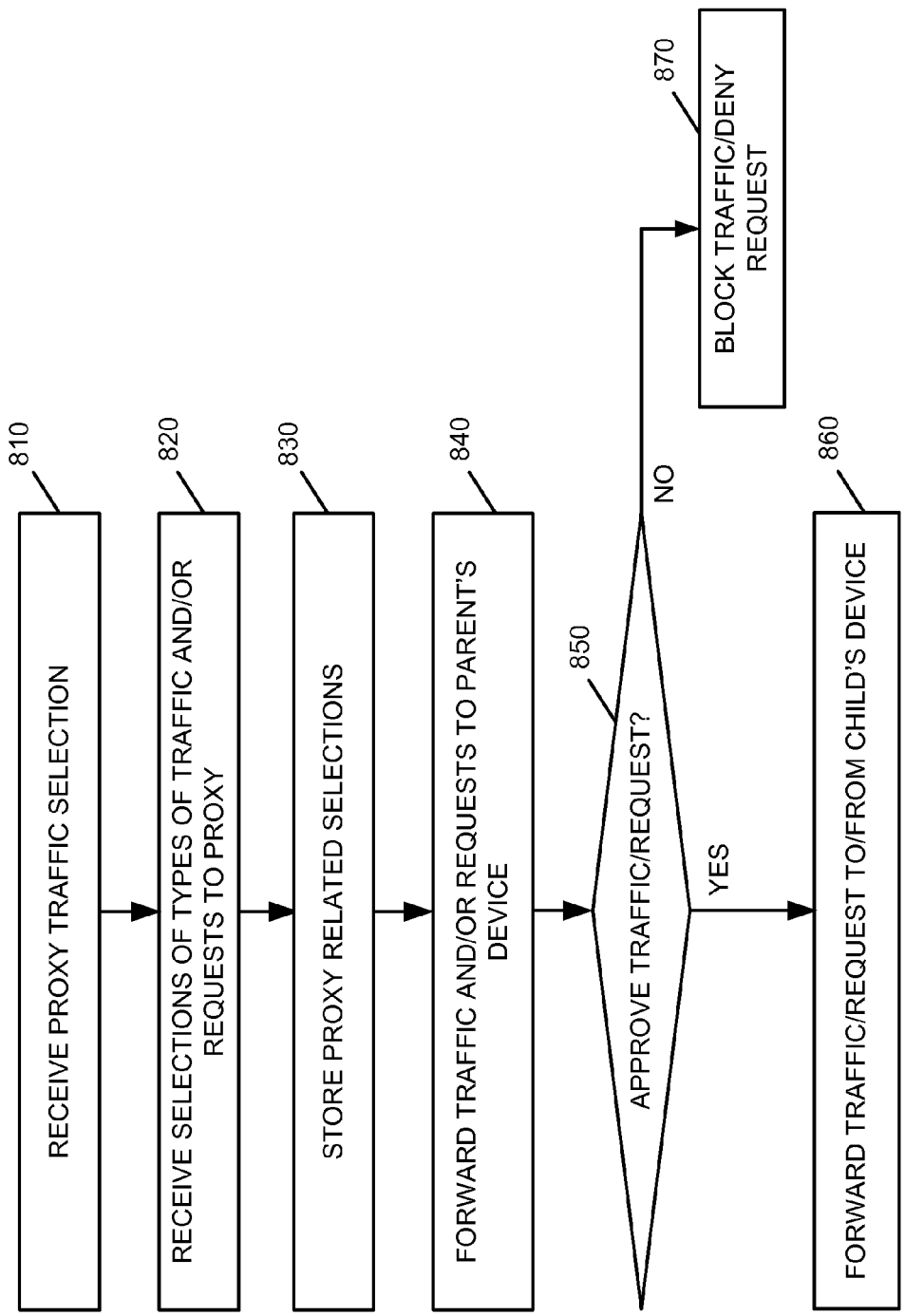

GRANULAR CONTROL SYSTEM

BACKGROUND INFORMATION

Mobile devices are now able to perform a wide range of tasks. For example, mobile devices are used as phones, as electronic mail (email) client devices, as book-reading devices, as gaming systems, etc. As a result, parents have a difficult time controlling how the devices are used by their children. In addition, since mobile devices are often used to download school materials/texts, and are needed so that a parent can stay in touch with his/her child, it becomes difficult for a parent to take the mobile device away from his/her child.

BRIEF DESCRIPTION OF THE DRAWINGS

FIG. 4 illustrates an exemplary table stored in the device of FIG. 2;

FIG. 8 is a flow diagram illustrating exemplary processing by various components of FIG. 1 in accordance with another exemplary implementation.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to controlling use of a mobile device. In an exemplary implementation, a mobile device may include a program that allows a party, such as a parent, to provide criteria for how the mobile device will be used. The criteria may include time based restrictions, use based restrictions, content based restrictions, etc. For example, a parent may set a time duration in which the child is able to use an application, such as a text messaging application, a game, etc. The parent may also set criteria for controlling the child's access to materials over a network, such as the Internet. In some implementations, the parent may also set criteria so that the child's mobile device must send and receive communications and requests for content/media via the parent's device for approval prior to sending and receiving communications or media.

Figure 1:
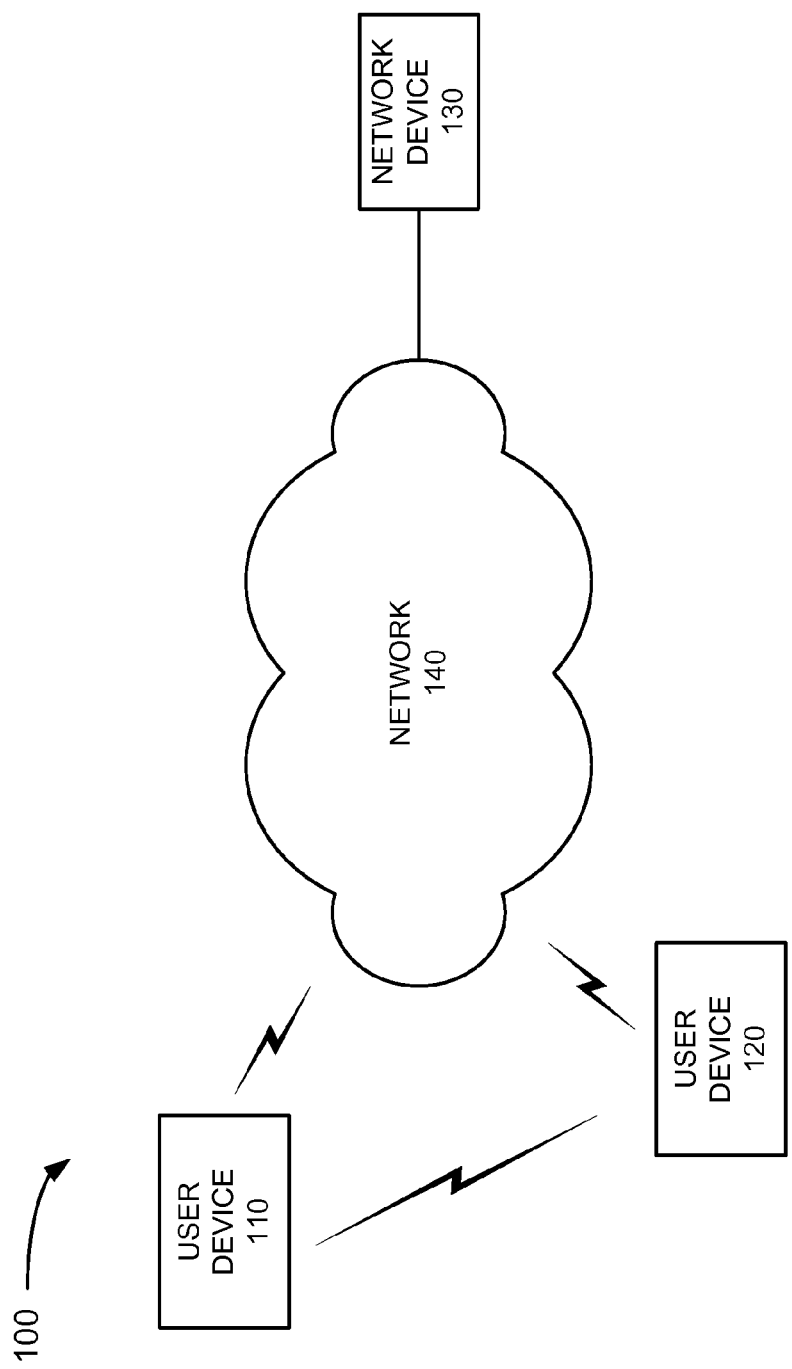
FIG. 1 illustrates an exemplary network in which systems and methods described herein may be implemented.

FIG. 1 is a block diagram of an exemplary network 100 in which systems and methods described herein may be implemented. Network 100 may include user device 110, user device 120, network device 130 and network 140.

User device 110 may include a mobile device, such as wireless or cellular telephone device (e.g., a conventional cell phone with data processing capabilities), a smart phone, a personal digital assistant (PDA) that can include a radiotelephone, etc. User device 110 may also include any type of computer device or system, such as a personal computer (PC), a laptop computer, a tablet computer, a notebook, a netbook, a game-playing device/system, a music-playing device/system, etc., that includes communication functionality.

User device 110 may connect to network 140 and other devices in network 100 (e.g., user device 120, network device 130, etc.) via any conventional technique, such as wired, wireless, or optical connections. User device 110 and the person associated with user device 110 (e.g., the party holding or interacting with user device 110) may be referred to collectively as user device 110 in the description below. In an exemplary implementation, user device 110 may include a number of application programs (also referred to herein as applications), such as an email application, a text messaging application, an Internet browser, a book reading application, games, a music playing application, etc.

In an exemplary implementation, user device 110 may represent a device associated with a party whose use of user device 110 is being managed by another party, such as a party associated with user device 120. For example, user device 110 may be associated with a child and user device 120 may be associated with the child's parent who manages/controls the child's use of user device 110.

User device 120 may include a mobile device, such as wireless or cellular telephone device (e.g., a conventional cell phone with data processing capabilities), a smart phone, a PDA that can include a radiotelephone, etc. User device 120 may also include any type of computer device or system, such as a PC, a laptop computer, a tablet computer, a notebook, a netbook, a game-playing device, a music-playing device, etc., that includes communication functionality.

User device 120 may connect to network 140 and other devices in network 100 (e.g., user device 120, network device 130, etc.) via any conventional technique, such as wired, wireless, or optical connections. User device 120 and the person associated with user device 120 (e.g., the party holding or interacting with user device 120) may be referred to collectively as user device 120 in the description below.

As described briefly above, in an exemplary implementation, user device 120 may represent a device associated with a party who is managing and/or monitoring use of user device 110. For example, user device 120 may be associated with a parent who is managing his/her child's use of user device 110.

Network device 130 may include a computer, server or other processing device that is able to communicate via network 140. In one implementation, network device 130 may be associated with an entity responsible for providing various services, such as communication services, to user devices 110 and 120. In an exemplary implementation, network device 130 may be used to monitor and/or control use of user device 110. For example, network device 130 may store criteria associated with providing various services to user device 110 that may be used to control or augment control criteria set by a parent, as described in detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a local area network (LAN), a wide area network (WAN), a personal area network (PAN), a WiFi network, an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100, may include thousands of user devices 110 and 120 and multiple network devices 130. In addition, network 140 may include additional elements, such as switches, gateways, routers, etc., that aid in routing data.

Further, various functions are described below as being performed by particular components in network 100. In other implementations, various functions described as being performed by one device may be performed by another device or multiple other devices, and/or various functions described as being performed by multiple devices may be combined and performed by a single device.

Figure 2:
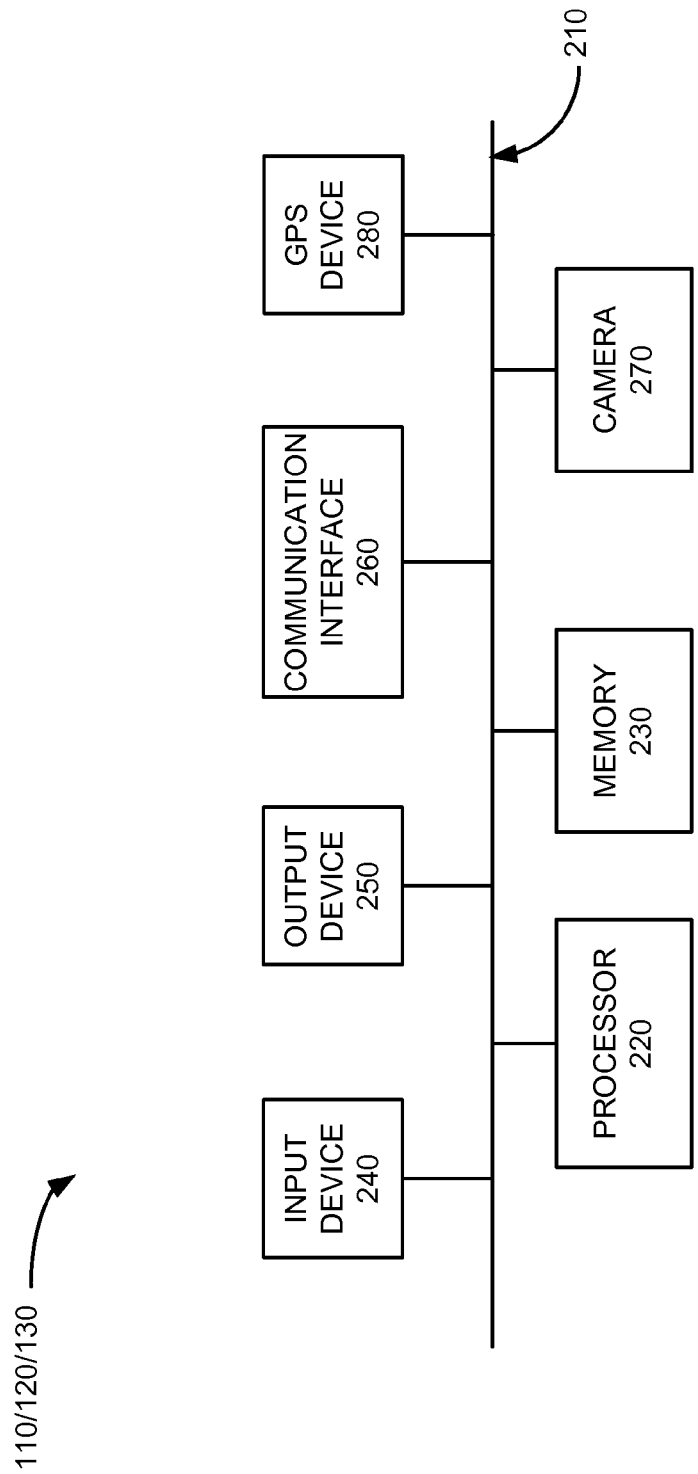
FIG. 2 illustrates an exemplary configuration of components implemented in one or more of the devices of FIG. 1.

FIG. 2 illustrates an exemplary configuration of user device 110. Other devices in network 100, such as user device 120 and network device 130 may be configured in a similar manner. Referring to FIG. 2, user device 110 may include bus 210, processor 220, memory 230, input device 240, output device 250, communication interface 260, camera 270 and global positioning system (GPS) device 280. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to user device 110, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD) that may be a touch screen display), a printer, a speaker, etc.

Communication interface 260 may include a transceiver that user device 110 (or user device 120, network device 130) may use to communicate with other devices via wired, wireless or optical mechanisms. Communication interface 260 may also include one or more radio frequency (RF) transmitters, receivers and/or transceivers and one or more antennas for transmitting and receiving RF data via network 140. Communication interface 260 may also include a modem or an Ethernet interface to a LAN or other mechanisms for communicating with elements in a network, such as network 140 or another network.

Camera 270 may include components that allow user device 110 to capture still and/or moving images. Camera 270 may include a lens and shutter as well as other conventional camera elements used to capture images.

GPS device 280 may include components that allow user device 110 to determine its location, such as its geographical coordinates. In an exemplary implementation, GPS device 280 may include a GPS receiver that receives information from GPS satellites that allows GPS device 280 to calculate its location (e.g., latitude and longitude).

The exemplary configuration illustrated in FIG. 2 is provided for simplicity. It should be understood that user device 110 (or user device 120 or network device 130) may include more or fewer devices than illustrated in FIG. 2. In an exemplary implementation, user device 110 (or user device 120, network device 130) may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
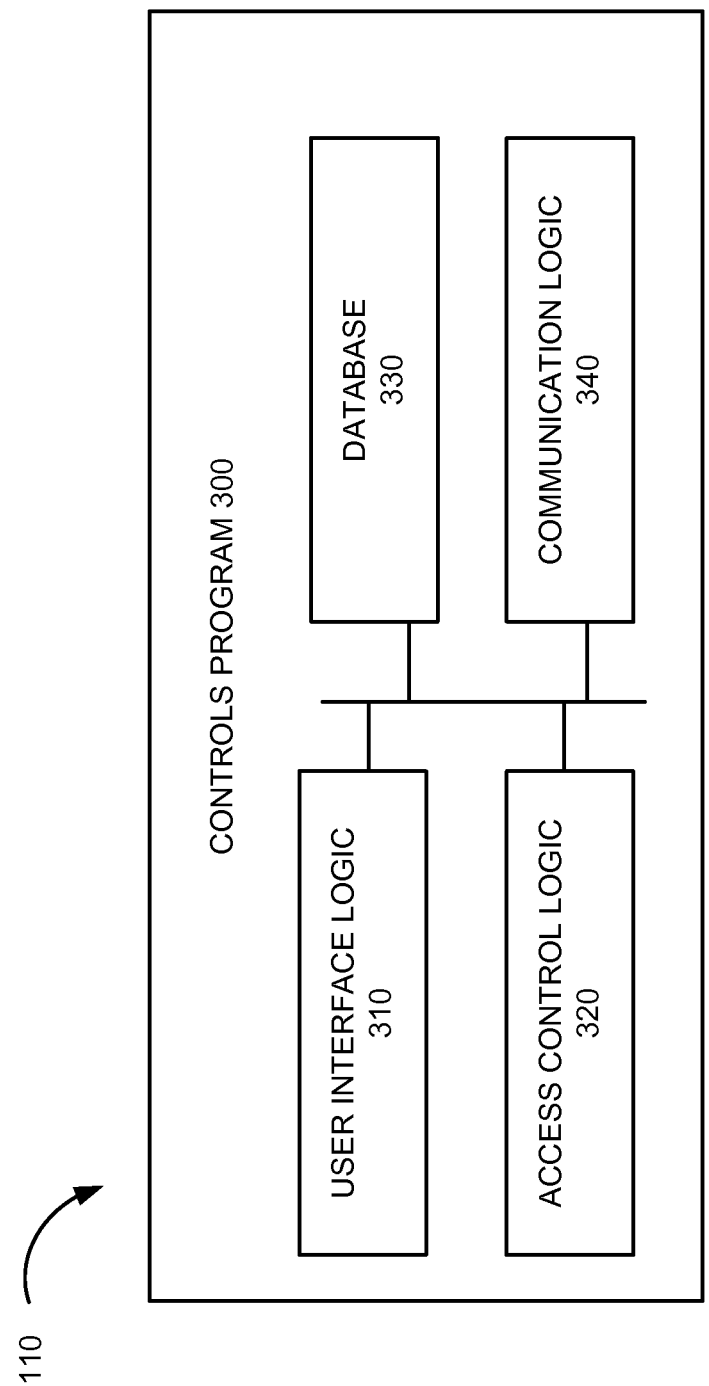
FIG. 3 illustrates an exemplary configuration of logic components implemented by one of the devices of FIG. 1.

FIG. 3 is an exemplary functional block diagram of components implemented in user device 110 of FIG. 2. In an exemplary implementation, all or some of the components illustrated in FIG. 3 may be stored in memory 230. For example, referring to FIG. 3, memory 230 may include controls program 300. Controls program 300 may include software instructions executed by processor 220 that allows a parent or other party to control the execution of applications/functionality of user device 110 and/or control information transmitted to/from user device 110.

Controls program 300 may include user interface logic 310, access control logic 320, database 330 and communication logic 340. Controls program 300 and its various logic components are shown in FIG. 3 as being included in user device 110. In alternative implementations, these components or a portion of these components may be located externally with respect to user device 110. For example, in some implementations, one or more of the components of controls program 300 may be located in or executed by user device 120 or network device 130.

User interface logic 310 may include logic to provide a user with an interface to enter information associated with controlling access to various programs stored in user device 110 or requesting access to various media via network 140. For example, user interface logic 310 may include a graphical user interface (GUI) that allows a user to set controls associated with use of applications stored in user device 110 on a per application or per functionality basis, such as time restrictions associated with use of an application, operational restrictions associated with use of an application or functionality of user device 110, content restrictions associated with media played/downloaded by user device 110, etc. This information may be stored in database 330, as described in more detail below. User interface logic 310 may also include logic to display information in response to an attempt to use a program or access outside of the control settings.

In some implementations, a party, such as a parent, may access controls program 300 directly on user device 110 and interface with the GUI provided by user interface logic 310 to set the various criteria for controlling access to programs. In other implementations, a parent may access controls program 300 on user device 110 remotely. For example, a parent may access controls program 300 remotely over network 140 from another device, such as user device 120. In either case, controls program 300 may require a user name and/or password in order to set the controls criteria. This will prevent a child from later changing various settings. In some implementations, controls program 300 may query other devices, such as user device 120 and/or network device 130 via, for example, an application programming interface (API) to identify controls/permission settings associated with various programs stored on user device 110, as described in detail below.

Access control logic 320 may include logic associated with determining whether access to various programs stored on user device 110 is permitted and/or determining whether user device 110 may be used to access content via network 140. For example, access control logic 320 may access database 330 to determine whether access to a particular program is to be granted. In other implementations, access control logic 320 may query other devices via an API to identify the appropriate access control settings.

Database 330 may store information identifying various programs, along with corresponding controls associated with use of the programs. As an example, database 330 may store table 400, as illustrated in FIG. 4. Referring to FIG. 4, table 400 may include a program field 410, a time restrictions field 420, a content restrictions field 430 and other field 440.

Program field 410 may identify various applications stored in user device 110, such as an electronic book (ebook) reader program, a text messaging program, an email program, an Internet browser, various games, music playing applications, etc. Time restrictions field 420 may store information identifying various time restrictions associated with use of the program stored in corresponding program field 410. For example, field 420 in entry 450-2 indicates that text messaging may be used Monday through Friday from 4:00 PM until 8:00 PM and on Saturday-Sunday from 10:00 AM until 10:00 PM. As another example, field 420 of entry 450-4 indicates that games may only be used for two hours per day.

Content restrictions field 430 may store information identifying types of content that are prohibited from being accessed or received by user device 110. For example, content restrictions field 430 for entry 450-3 may indicate that web sites identified as having adult content may be prohibited from being accessed by user device 110. Other field 440 may include other criteria/restrictions associated with user device 110. For example, other field 440 in entry 450-2 indicates that all text messages must be proxied through the parent's user device. Other field 440 in entry 450-5 indicates that no attachments are permitted when using the email program.

Referring back to FIG. 3, communication logic 340 may include logic for communicating with other devices in network 100. For example, in one implementation, communication logic 340 may transmit messages (e.g., via an API) when a user would like to request access to a program that is listed in database 330. In this case, communication logic 340 may receive information from another device, such as user device 120 and/or network device 130 to determine whether the user is entitled to interact with the program of choice. Communication logic 340 may then forward the information to access control logic 320 to allow access control logic 320 to permit/deny the use or access.

Figure 5:
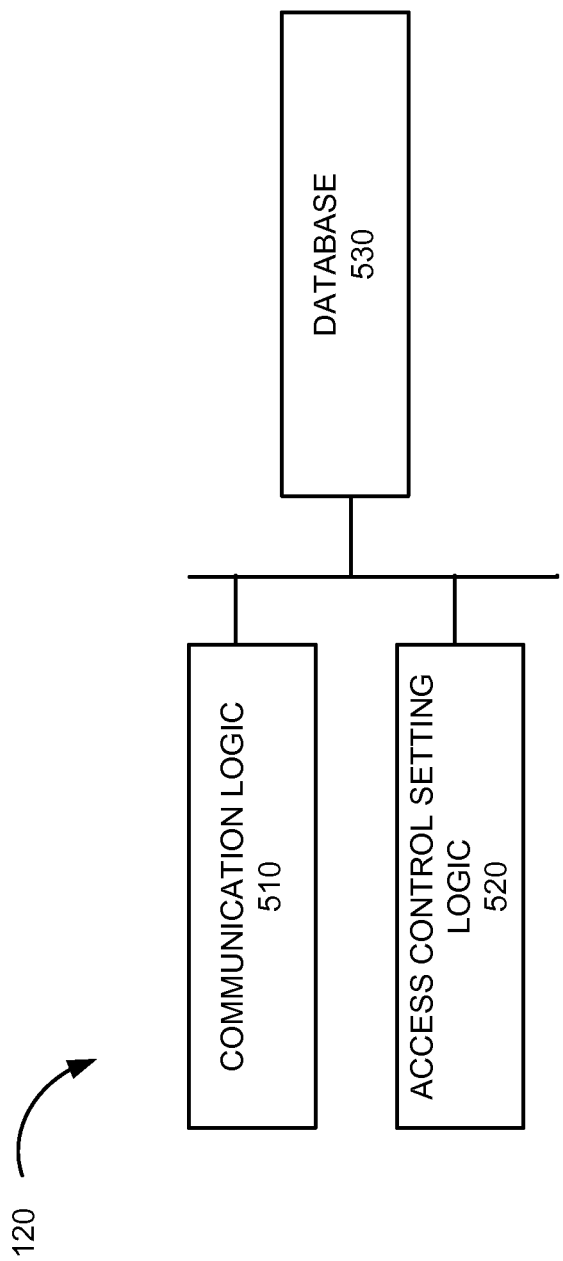
FIG. 5 illustrates an exemplary configuration of logic components implemented by another one of the devices of FIG. 1.

FIG. 5 illustrates an exemplary configuration of logic components implemented in user device 120. Referring to FIG. 5, user device 120 may include communication logic 510, access control setting logic 520 and database 530. It should be understood that user device 120 may include more or fewer logic devices than illustrated in FIG. 5.

Communication logic 510 may include logic that allows user device 120 to communicate with other devices in network 100 via network 140. For example, communication logic 510 may allow user device 120 to communicate with user device 110 and network device 130 via network 140.

Access control setting logic 520 may include logic for interacting with controls program 300 in user device 110. For example, access control logic 520 may allow a user associated with user device 120 to remotely set various criteria or change various criteria in controls program 300 with respect to allowing user device 110 to interact with various programs, download media, etc. In other implementations, user device 110 and user device 120 may operate in a master/slave or client/server relationship in which user device 120 stores a master side version of controls program 300 that allows user device 120 to set and store criteria associated with use of user device 110 directly on user device 110. In either case, access control setting logic 520 may allow a parent at user device 120 to set controls associated with use of user device 110.

Database 530 may include one or more databases or information associated with a controlling access to programs or media by user device 110. For example, database 530 may store a table similar to table 400 described above with respect to FIG. 4. In this implementation, a parent at user device 120 may access the table to identify and/or change criteria associated with controlling use of user device 110.

In an exemplary implementation, communication logic 510, access control setting logic 520, and database 530 may include one or more processors, microprocessors or other processing logic, such as processor 220 (FIG. 2) used to interpret and execute instructions. In such implementations, the logic components may include software instructions stored in a computer-readable medium, such as memory 230. The software instructions may be read into memory from another computer-readable medium or from another device via a communication interface. The software instructions contained in memory may cause the various logic components to perform processes that are described below. Alternatively, hardwired circuitry may be used in place of or in combination with software instructions to implement the logic processes consistent with the exemplary embodiments. Thus, systems and methods described herein are not limited to any specific combinations of hardware circuitry, firmware, and software.

Figure 6:
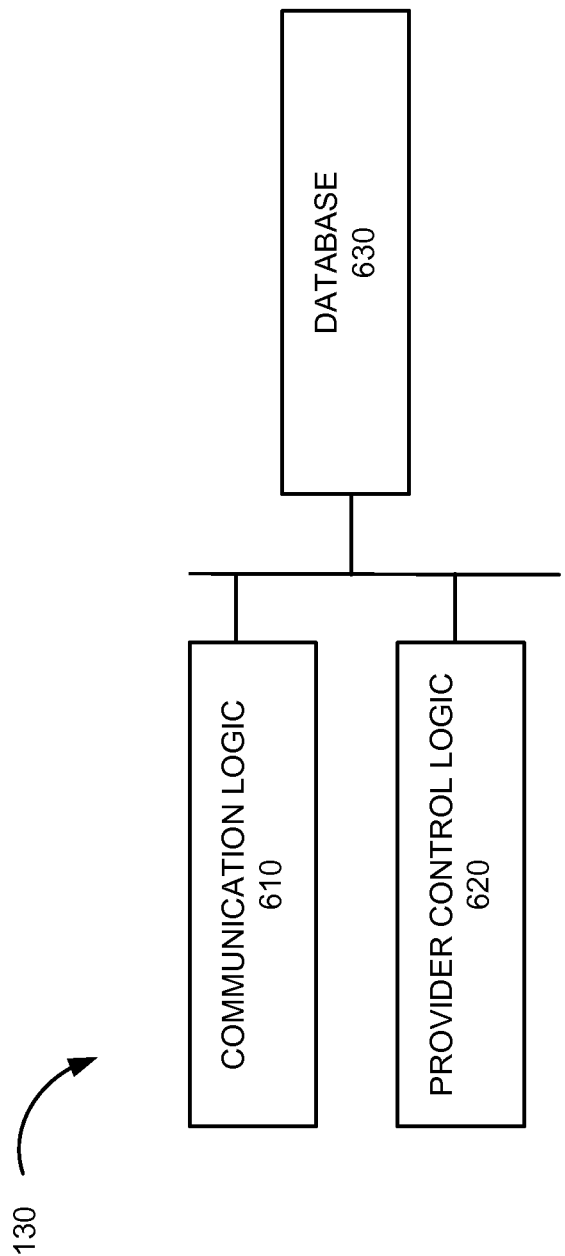
FIG. 6 illustrates an exemplary configuration of logic components implemented by still another one of the devices of FIG. 1.

FIG. 6 illustrates an exemplary configuration of logic components implemented in network device 130. Referring to FIG. 6, network device 130 may include communication logic 610, provider control logic 620 and database 630. It should be understood that network device 130 may include more or fewer logic devices than illustrated in FIG. 6.

Communication logic 610 may include logic that allows network device 130 to communicate with other devices in network 100 via network 140. For example, communication logic 610 may allow network device 130 to communicate with user device 110 and/or user device 120 via network 140. In an exemplary implementation, user device 120 may communication with network device 130 to set and/or augment controls with respect to use of user device 110, as described in detail below.

Provider control logic 620 may include logic for interacting with controls program 300 in user device 110 and user device 120. For example, provider control logic 620 may allow a parent to use network device 130 to control and/or augment control of user device 110. As an example, if a parent is not available to provide approval for use of a particular program, the parent may indicate that network device 130 is authorized to determine whether to provide access to a particular file/media. In some instances, provider control logic 620 may be configured to allow access to types of media indicated as being appropriate for children of a certain age. In other implementations, provider control logic 620 may be configured to provide access based on previous access granted to user device 110 (via user device 120). In each case, a parent at user device 120 may interact with provider control logic 620 to set the particular criteria associated with allowing access to various programs and/or forwarding media to user device 110.

Database 630 may include one or more databases or information associated with a controlling access to media by a large number of user devices, such as user device 110. For example, database 630 may store a table of criteria provided by a parent at user device 120. In this implementation, a parent at user device 120 may access the table to identify and/or change criteria associated with controlling use of user device 110. In addition, database 630 may be used to store profiles such that an individual's profile or a group profile may be readily applied to a new/replacement user device 110 or user device 120.

In an exemplary implementation, communication logic 610, provider control logic 620, and database 630 may include one or more processors, microprocessors or other processing logic, such as processor 220 (FIG. 2) used to interpret and execute instructions. In such implementations, the logic components may include software instructions stored in a computer-readable medium, such as memory 230. The software instructions may be read into memory from another computer-readable medium or from another device via a communication interface. The software instructions contained in memory may cause the various logic components to perform processes that are described below. Alternatively, hardwired circuitry may be used in place of or in combination with software instructions to implement the logic processes consistent with the exemplary embodiments. Thus, systems and methods described herein are not limited to any specific combinations of hardware circuitry, firmware, and software.

Figure 7:
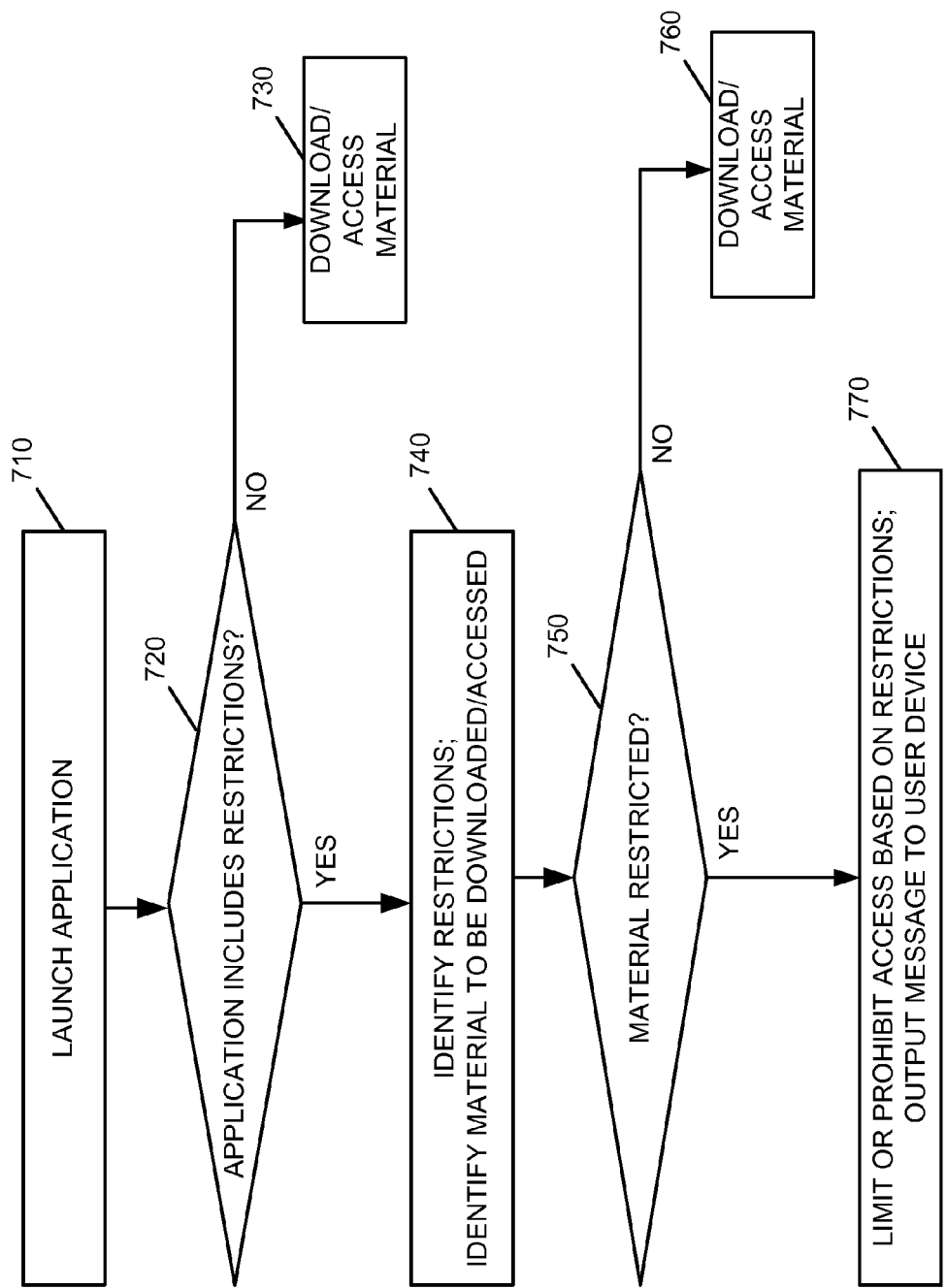
FIG. 7 is a flow diagram illustrating exemplary processing by various components illustrated in FIG. 1 in accordance with an exemplary implementation.

FIG. 7 is a flow diagram illustrating exemplary processing associated with use of user device 110 in network 100. In this example, assume that a party associated with user device 110 would like access one of the programs stored on user device 110, such as an electronic book reader/application. Processing may begin with the party associated with user device 110 (referred to herein as the user) opening or launching the ebook reader/application (block 710). Upon launching the ebook reader/application, controls program 300 may determine if the ebook reader application is included in database 330 as a program that includes various user restrictions (block 720). If restrictions associated with the use of the ebook reader application are not stored in database 330 (e.g., table 400), indicating that there are no restrictions associated with the ebook reader (block 720—no), user device 110 may execute the application and download/access the desired information for reading via the ebook reader application (block 730).

If, however, the ebook reader application includes restrictions (block 720—yes), access control logic 320 may identify the restrictions (block 740). For example, referring to table 400 (FIG. 4), program field 410 in entry 450-1 identifies the ebook reader and field 420 of entry 450-1 indicates that pleasure reading is prohibited on Monday through Friday between the hours of 8:00 AM and 7:30 PM and that reading of school materials is prohibited between the hours of 11:00 PM and 6:00 AM.

Controls program 300 may then identify the material to be downloaded or accessed (block 740). In this example, assume that the user has selected a latest "Twilight" series book and the current day/time is Thursday at 7:00 PM. In this case, access control logic 320 may determine whether the selected material is restricted from being read at the current time (block 750). For example, access control logic 320 may identify the Twilight book as corresponding to pleasure reading. In one implementation, school-related materials may be identified based on one or more of identifying metadata or tags, included with the material, that identifies the material as school related, by comparing the requested material to a stored list identifying all school materials, identifying a site via which the material will be accessed, etc. In this case, assume that access control logic 320 identifies the Twilight book as pleasure reading. Access control logic 320 may also identify that field 420 of entry 450-1 indicates that pleasure reading is prohibited Monday through Friday between the hours of 8:00 AM and 7:30 PM. In this case, access control logic 320 may block user device 110 from downloading or accessing the book since the current time (i.e., Thursday at 7:00 PM in this example) is within the restricted time window (block 770). User interface logic 310 may also provide a pop-up message via output device 250 (e.g., an LCD screen) of user device 110 indicating that pleasure reading is not allowed during the hours of 8:00 AM and 7:30 PM (block 770). User device 110 may be configured to send notification(s) to user device 120 with details of attempts to access materials outside permitted conditions. Alternatively, access violation notifications may be sent to network device 130 and stored in database 630 for future review by the owner/operator of user device 120.

Returning to block 750, assume that the user selected material via the ebook reader that is school-related. In this case, access control logic 320 may determine that the school materials may be accessed/downloaded since the current time (i.e., 7:00 PM) is not within the restricted window (block 750—no). In this case, access control logic 320 may allow the user to download/access the desired material (block 760).

In some implementations, if a child would like to execute an application or access materials outside the allotted time, user interface logic 310 may allow the user to transmit a notification, such as a text message, email, automated voice call to user device 120 requesting that the child would like to access the identified materials. The parent at user device 120 may then decide to override the restrictions and grant access to the materials. In this case, access control setting logic 520 may send a communication to access control logic 320 signaling access control logic 320 to allow the download/access. In this manner, the child may be able to ask for permission to perform a particular action (e.g., download or purchase a book) when controls program 300 initially denies the request.

In some implementations, actions performed by user device 110 may be logged at network device 130. In this case, the parent at user device 120 may view recent activity associated with use of user device 110 and decide whether to allow access and/or set a time or bandwidth limit associated with the use of an application. In this case, access control setting logic 520 may send a communication to access control logic 320 signaling access control logic 320 to allow the download/access or permit use of the application.

As described above, various applications on user device 110 may be restricted based on criteria defined by a party, such as a parent. In addition, basic functionality or features of user device 110 may also be limited/restricted in a similar fashion. For example, texting via user device 110 may be disabled while the child is at school or supposed to be asleep. In an alternative implementation, texting may only be permitted to parent or sibling devices during the restricted times. Similarly, web sites accessible via user device 110's browser may be controlled by controls program 300. Still further, in some implementations, use of a keypad of mobile device 110 to make phone calls may be disabled during certain hours, use of camera 270 and/or GPS device 280 may be disabled during certain hours, etc.

In other implementation, controls program 300 may allow a parent to place user device 110 in a mode in which data traffic and/or requests are proxied through the parent's device(s) (e.g., user device 120). For example, other field 440 of entry 450-2 indicates that text messaging should be proxied through the parent's device.

FIG. 8 illustrates exemplary processing associated with proxying traffic directed to/from user device 110 through another device. In this implementation, processing may begin with launching controls program 300. User interface logic 310 may provide a menu of options, including "proxy traffic via another device." In this example, assume that a party (e.g., a parent) associated with user device 110 selects the proxy traffic option. User interface logic 310 receives the proxy traffic selection (block 810) and may provide a message for the party to enter a telephone number, email address, Internet protocol (IP) address or another identifier associated with the device that will proxy the traffic.

In this case, assume that the party enters the telephone number of user device 120. Alternatively, if the email program is being proxied, the party may enter his/her email address. User interface logic 310 receives the telephone number of the device that will be used to proxy traffic and/or requests from user device 110. In this implementation, user interface logic 310 may also query the parent as to what types of communications and/or requests are to be proxied via user device 120.

For example, a parent may like to see both incoming and outgoing text messages for each texting session while the texting session is occurring, such as in a passive monitoring mode. In other instances, a parent may interact with user interface logic 310 to request that outbound texts/requests will be sent to user device 120 before delivery (with an option to substitute parent's number for the child's number or to send texts from user device 110 (i.e., the child's device) only after approval from the parent) and that inbound texts are to be sent to the parent's phone (i.e., user device 120 in this example) for approval before being forwarded to the child's phone (i.e., user device 110). In some implementations, proxying texts may be done invisibly from the child's perspective or with an indicator showing the current mode that all texts are being transmitted to/from user device 120. In some instances, proxying texts in this manner may increase the use of unlimited text plans by a parent since he/she would be aware of all texts being sent. In each case, the parent at user device 120 may select the type of proxying and user interface logic 310 may receive the selections (block 820). User interface logic 310 may store the proxying related information in database 330 (block 830).

For example, other field 440 of entry 450-2 in table 400 (FIG. 4) may indicate that text messaging sessions are to be proxied via the parent's user device. Database 330 (e.g., table 400) may also include further information identifying the type of proxying (e.g., passive monitoring, active approval, etc.) based on the information provided by the parent.

After the proxying related information is selected by the user and stored by controls program 300, assume that the child at user device 110 launches the text messaging application at user device 110 and enters a text message to send to a friend. Further assume that database 330 stores information indicating that the child's parent must approve all outgoing and incoming texts. In this case, communication logic 340 may forward the child's text message to user device 120 (block 840). The parent may then decide whether the text message can be sent (block 850).

For example, if the parent decides that the text message does not contain any inappropriate language, the parent at user device 120 may determine that the text message can be sent (block 850—yes). In this case, communication logic 510 at user device 120 may send a communication to user device 110 authorizing user device 110 to transmit the text message. User device 110 receives the approval and communication logic 340 transmits the text message. If, however, the parent determines that the text is inappropriate, the parent at user device 120 may decide to block transmission of the text message (block 850—no). In this case, communication logic 510 at user device 120 may send a communication to user device 110 indicating that the user device 110 is not to send the text message (block 870). User device 110 may also output a message via output device 250 indicating that the text message has been blocked and will not be sent. Incoming text messages may be similarly sent to user device 120 for approval before being displayed/output by user device 110.

Other types of actions, such as requesting downloads, purchases, etc., may be proxied through the parent's device (e.g., user device 120). In this manner, a parent can ensure that his/her child is not using user device 110 in a manner not agreed to by the parent.

As another example, use of a browser on user device 120 may be controlled or proxied. For example, field 410 of entry 450-3 in table 400 (FIG. 4), indicates that the Internet browser of user device 110 includes time restrictions and content restrictions. In this example, time restrictions field 420 of entry 450-2 indicates that Internet browsing is prohibited on Monday-Friday between the hours of 6:00 AM to 3:00 PM (e.g., during school hours). Content restrictions field 430 also indicates that adult content is restricted. In this case, access control logic 320 may attempt determine whether content on a web site of interest contains adult-related materials based on a name of the website, actual content of a webpage of interest, etc. If the website is determined to contain adult content, access control logic 320 may deny access to the website.

In other instances, a child's attempts to use the browser on user device 110 may be proxied via user device 120. In this case, user device 110 may send a message to user device 120 identifying the website of interest for approval by the parent. Still further, the communication from user device 110 may include an option for the parent to view or visit the website/webpage first. In still other implementations, the history of Internet sites accessed by user device 110 may be logged to user device 120 and/or network device 130 so that the parent can later look at the sites that were accessed.

In still other alternative implementations, a parent may grant access to a particular website at some point in time. However, since content that was approved may change over time, a parent may interact with user interface logic 310 to indicate that content provided to user device 110 at one point in time must be re-approved at a later time. In addition, content accessed by user device 110 may be mirrored for a period of time to a logging site, such as network device 130, so that the parent can replay the traffic later without impacting the child's wait times.

In addition, in some implementations, controls program 300 may automatically log use information, such as the name of an application being used, start/suspend/resume/stop/idle times of the application, messages sent/received by user device 110, etc., to a network-based data storage device, such as network device 130. The parent may then later retrieve/view the information associated with the child's use of user device 110. In this manner, if the child later claims he/she was studying, the parent can check network device 130 and determine that the child was playing a game (e.g., Angry Birds) for a certain number hours in the last two days.

Controls program 300 may also include security to prevent a child from trying to disable networking and tweak time settings. For example, if the child at user device 110 attempts to change password protected user settings, controls program 300 may go into a lockout mode allowing access to only a very restricted list of applications/features.

In the scenarios described above, user device 110 controls and/or limits access to programs and/or media based on user-defined (e.g., parent-defined) criteria stored on user device 110. In some implementations, the control criteria may be stored on user device 110 and/or user device 120. In still other implementations, the control criteria may be stored at network device 130.

For example, as described above, the service provider that provides communication services (e.g., phone, Internet, data, etc.) to user device 110 or some other entity may store the control criteria at, for example, network device 130. In this case, database 630 (FIG. 6) may store information associated with a large number of customers/users for which the service provider (via network device 130) will control actions performed by the corresponding user devices of the customers based on customer (e.g., parent) defined criteria. In this case, user device 110 may include an API that contacts network device 130 on a per application basis to identify the particular control criteria in a similar manner as that described above.

In addition, in some implementations, network device 130 may augment criteria defined by a parent and stored in user device 110. For example, assume that controls program 300 is set to require parental approval for all downloads, such as books, songs, applications, etc. In this case, further assume that a child attempts to download a book and user device 110 sends a notification to user device 120 requesting approval. In this case, further assume that the parent receives the request, but would like to obtain more information associated with the requested book. The parent at user device 120 may then contact network device 130 to identify reviews/ratings associated with the requested book.

For example, network device 130 may store rating or reviews of the book by other parents, teachers, etc. The parent at user device 120 may click on a particular rating and see other ratings provided by that particular reviewer. This may let the parent see if he/she has agreed with other ratings/reviews provided by that reviewer. The parent may then use the ratings to aid in determining whether to allow the child to download the book.

In other implementations, if the child at user device is attempting to download some media, such as a song, the parent may be unavailable or busy and may not be able to provide his/her approval/disapproval within a predetermined period of time (e.g., 5 minutes, 15 minutes, etc). In this scenario, the parent may have set criteria that the request for approval will be forwarded to network device 130 to determine whether access should be granted. In this case, network device 130 may store information indicating that other parents have permitted access to the requested media (i.e., song in this example) to their children 98% of the time. Network device 130 may be configured to approve the request when other parents have permitted access a threshold percentage of time (e.g., 90%). In this case, network device 130 may signal user device 110 to permit the download. Network device 130 may also send a communication to user device 120 indicating that user device 110 was provided access to the particular media. The parent at user device 120 may be able to later revoke the permission.

As described above, user device 110 may communicate with user device 120 and/or network device 130 to control use of user device 110. In some implementations, network device 130 may further aid in controlling or augment control of user device 110. For example, network device 130 may store information identifying all school texts within the jurisdiction (e.g., county) in which the child and parent associated with user devices 110 and 120 reside. This list of school related materials may allow user device 110 to easily identify school materials that a child should be permitted to access. That is, access control logic 320 at user device 110 may access the stored list to determine whether material is school related or pleasure reading.

As described above, network device 130 may store information that augments information stored by user devices 110 and 120. For example, network device 130 may store ratings information associated with various media. In still other implementations, network device 130 may provide an option to allow a parent to auto-search content that is requested for download. As an example, the parent at user device 120 may request that network device 130 scan/auto-search the requested content and provide a score based on key words, phrases, classifications, etc., associated with the content. In one implementation, content with no profanity may get a score of +1, while content with profanity, vulgar language or anatomical terms may get a score of −5. Content with favorable ratings by reviewers may also get a score of +1. If the cumulative score for the content meets a threshold value, network device 130 may automatically provide access to the material. In other instances, the parent at user device 120 may still require approval. In this manner, a book that describes a violent crime, death, genocide, etc., that is historical in nature, but may generate a low cumulative score may still be approved by the parent.

As another example, materials provided by a teacher at the child's school can be flagged to ensure that the child can access the material. For example, messages (email, text, RSS feeds, etc.) from the child' school/teacher(s) can be flagged based on assignments. In this manner a text with objectionable terms or text otherwise indicated as pleasure reading (e.g. Frankenstein) may be flagged via, for example, an RSS feed with the child's English reading assignment. In this case, network device 130 may add the "educational/school" tag to the ebook to make it available to the child, subject to any time or other restrictions provided in table 400.

In the manner described above, parents or other guardians may control a child's access to programs and functionality of a user device. For example, applications and functionality of user device 110 may be limited based on pre-defined parent criteria, such as time based criteria, use based criteria, content-based criteria, or any other criteria provided.

Implementations described herein provide for controlling use of a mobile device or other electronic device. As described above, a parent/guardian may provide criteria for how a child's mobile device will be used. This may allow the parent to reduce the chances that the child will use the device in an manner not approved by the parent or access inappropriate material.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to managing use of a mobile device. In other implementations, other types of electronic devices can be managed/controlled in a similar manner.

Further, while series of acts have been described with respect to FIGS. 7 and 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, articles such as "a," "an," and "the" are intended to include one or more items. Further, the phrase "based on" is intended to mean "based, at least in part, on" unless explicitly stated otherwise.

What is claimed is:

1. A non-transitory computer-readable medium having stored thereon sequences of instructions which, when executed by at least one processor, cause the at least one processor to:
   provide a user interface configured to allow a first party to select a first one of a plurality of applications stored in a user device;
   receive, from the first party, restrictions associated with use of the first application, wherein the restrictions include at least one of time based restrictions, content based restrictions or use based restrictions;
   receive, from a user of the user device, a request for access to the first application;
   execute the first application in response to the request;
   receive, from the user, a second request for performing a first action by the first application;
   determine whether the first action is permitted based on the received restrictions;
   forward a third request associated with use of a second application to the first party for approval of the third request;
   forward, in response to not receiving a reply to the third request from the first party within a predetermined period of time, the third request to a network device; and
   receive, from the network device, a reply to the third request, wherein the reply comprises an approval or disapproval of the third request.

2. The non-transitory computer-readable medium of claim 1, further including instructions for causing the at least one processor to:
   signal the first application to block execution of the first action in response to determining that the first action is not permitted.

3. The non-transitory computer-readable medium of claim 1, further including instructions for causing the at least one processor to:
   forward a first message associated with use of the second application to the first party, wherein the first message is generated by the user and is intended for a second party; and
   receive, from the first party, approval or denial of the first message prior to the first message being transmitted to the second party.

4. The non-transitory computer-readable medium of claim 1, further including instructions for causing the at least one processor to:
   forward requests and messages generated by at least some of the plurality of applications stored in the user device to a first device associated with the first party.

5. The non-transitory computer-readable medium of claim 1, further including instructions for causing the at least one processor to:
   allow or deny the third request based on the reply.

6. The non-transitory computer-readable medium of claim 1, further including instructions for causing the at least one processor to:
   receive, from the user of the user device, a request for access to a third application; and
   query the network device to determine whether access to the third application is permitted.

7. The non-transitory computer-readable medium of claim 1, further including instructions for causing the at least one processor to:
   receive, from the first party, restrictions associated with each of the plurality of applications;
   store the restrictions associated with each of the plurality of applications; and
   control access to the plurality of applications based on the stored restrictions.

8. The non-transitory computer-readable medium of claim 7, further including instructions for causing the at least one processor to:
   receive, from the first party, restrictions associated with functionality of the user device; and
   control access to the functionality based on the restrictions.

9. The non-transitory computer-readable medium of claim 1, further including instructions for causing the at least one processor to:
   store information identifying actions performed by the user device, media accessed by the user device and communications transmitted and received by the user device; and
   provide, to the first party, access to the stored information identifying the actions performed by the user device, the media accessed by the user device and the communications transmitted and received by the user device.

10. A computer-implemented method, comprising:
   receiving, from a first party, restrictions associated with each of a plurality of applications stored on a mobile device, wherein the restrictions include at least one of time based restrictions or use based restrictions;
   storing the restrictions associated with each of the plurality of applications;

receiving, from a user of the mobile device, a request for access to a first application;

providing access to the first application in response to the request;

receiving, from the user, a second request for performing a first action by the first application;

determining whether the first action is permitted based on the stored restrictions;

forwarding a third request associated with use of a second application to the first party for approval of the third request; and forwarding, in response to not receiving a reply to the third request from the first party within a predetermined period of time, the third request to a network device for approval or disapproval of the third request.

11. The computer-implemented method of claim 10, further comprising:

signaling the first application to block execution of the first action in response to determining that the first action is not permitted.

12. The computer-implemented method of claim 10, further comprising:

forwarding a first message associated with use of a text messaging application or electronic mail application to the first party, wherein the first message is generated by the user and is intended for a second party; and receiving, from the first party, approval or denial of the first message prior to the first message being transmitted to the second party.

13. The computer-implemented method of claim 10, further comprising:

forwarding, via a network, actions and messages generated by at least some of the plurality of applications stored in the mobile device to a device associated with the first party, wherein the first party is a different entity than the user of the mobile device.

14. The computer-implemented method of claim 10, further comprising:

receiving, from the network device, a reply to the third request; and allowing or denying the third request based on the reply.

15. The computer-implemented method of claim 10, further comprising:

receiving, from a user of the mobile device, a fourth request for access to a third application; and querying the network device to determine whether access to the third application is permitted.

16. The computer-implemented method of claim 10, further comprising:

logging actions performed by the mobile device in a log at a network storage device; and accessing, by the first party, the log.

17. The computer-implemented method of claim 16, wherein the logging actions comprises storing information identifying actions performed by the mobile device, media accessed by the mobile device and communications transmitted and received by the mobile device.

18. A computer-implemented method, comprising:

receiving, from a first party associated with a mobile device, criteria or restrictions associated with accessing media files by the mobile device;

storing the criteria or restrictions;

storing information associated with a plurality of media files;

receiving, from a user of the mobile device, a communication indicating that the user of the mobile device is attempting to access to a first one of the plurality of media files;

determining, based on the criteria or restrictions provided by the first party associated with the mobile device, whether the user of the mobile device should be granted access to the first media file;

sending a communication to the mobile device instructing the mobile device to grant or deny the user of the mobile device access to the first media file based on the determining;

storing second information identifying actions performed by the mobile device, media accessed by the mobile device and communications transmitted and received by the mobile device;

providing, to the first party, access to the stored second information identifying the actions performed by the mobile device, the media accessed by the mobile device and the communications transmitted and received by the mobile device;

receiving, from the user of the mobile device, a second communication indicating that the user of the mobile device is attempting to access to a second one of the plurality of media files;

forwarding a request associated with the attempted access of the second media file by the user of the mobile device to the first party for approval of the request; and determining, in response to not receiving a reply to the request from the first party within a predetermined period of time, whether to approve the request based on the criteria or restrictions provided by the first party.

19. The computer-implemented method of claim 18, further comprising:

storing ratings or reviews of the first media file, and wherein the determining whether the user of the mobile device should be granted access to the first media file further comprises:

determining whether the user of the mobile device should be granted access to the first media file based on the stored ratings or reviews.

20. The computer-implemented method of claim 19, wherein the storing ratings or reviews comprises storing ratings or reviews of the first media file made by a plurality of parents.

21. The computer-implemented method of claim 18, further comprising:

storing criteria associated with a plurality of mobile devices, wherein the criteria are provided by parents or guardians associated with users of the mobile devices.

22. The computer-implemented method of claim 18, further comprising:

forwarding a second request associated with use of a first application stored on the mobile device to the first party for approval of the second request; and forwarding, in response to not receiving a reply to the second request from the first party within a predetermined period of time, the second request to a network device for approval or disapproval of the second request.

* * * * *